United States Patent [19]

Harms et al.

[11] 4,273,553
[45] Jun. 16, 1981

[54] ANTHRAQUINONE REACTIVE DYESTUFFS

[75] Inventors: Wolfgang Harms; Horst Jäger; Klaus von Oertzen; Klaus Wunderlich, all of Leverkusen, Fed. Rep. of Germany

[73] Assignee: Bayer Aktiengesellschaft, Leverkusen, Fed. Rep. of Germany

[21] Appl. No.: 86,615

[22] Filed: Oct. 19, 1979

[30] Foreign Application Priority Data

Nov. 8, 1978 [DE] Fed. Rep. of Germany ....... 2848403
Nov. 24, 1978 [DE] Fed. Rep. of Germany ....... 2850919

[51] Int. Cl.$^3$ .................... C09B 62/06; C07D 251/00
[52] U.S. Cl. .......................................... 8/549; 8/676; 8/677; 8/679; 8/917; 8/918; 8/924; 544/188; 544/189
[58] Field of Search ................ 8/39 R, 849, 676, 677, 8/679, 918, 924, 917; 544/189, 188

[56] References Cited

U.S. PATENT DOCUMENTS

| 3,558,620 | 1/1971 | Bien et al. | 544/189 |
| 3,558,621 | 1/1971 | Bien et al. | 544/189 |
| 4,052,386 | 10/1977 | Bein et al. | 544/294 |

FOREIGN PATENT DOCUMENTS 1554529 10/1979 United Kingdom .
1564647 4/1980 United Kingdom .

Primary Examiner—A. Lionel Clingman
Attorney, Agent, or Firm—Sprung, Felfe, Horn, Lynch & Kramer

[57] ABSTRACT

Dyestuffs of the formula

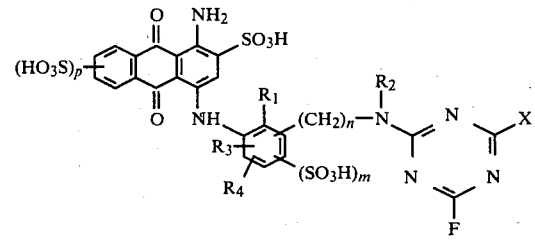

wherein $R_1$, $R_2$, $R_3$, $R_4$, m, n, p and X have the meaning given in the description, and their use for dyeing and printing materials containing hydroxyl groups or amide groups, such as textile fibres, filaments and woven fabrics of wool, silk or synthetic polyamide or polyurethane fibres, and for dyeing and printing natural or regenerated cellulose in dyeings and prints which are fast to washing. Blue dyeings and prints which are fast to light and wet processing are obtained.

5 Claims, No Drawings

ANTHRAQUINONE REACTIVE DYESTUFFS

The present invention relates to reactive dyestuffs of the formula

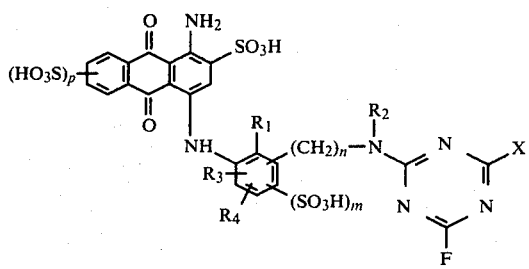

wherein
- $R_1 = C_1-C_4$-alkyl or halogen,
- $R_2 = H$ or $C_1-C_4$-alkyl,
- $R_3$ and $R_4 = H$, $C_1-C_4$-alkyl or halogen,
- m, n and p = 0 or 1 and
- $X = NH_2$, where $n = 0$, and $NH_2$, $C_1-C_4$-alkylamino or
- $C_1-C_4$-dialkylamino, where $n = 1$.

The alkyl radicals can optionally be substituted.

Examples of suitable radicals $R_1$ are $CH_3$, $C_2H_5$, F, Cl or Br.

Suitable radicals $R_2$ are, in addition to H: $CH_3$, $C_2H_5$, $CH_2-CH_2-OH$, $CH_2-CH_2-OSO_3H$, $CH_2-COOH$, $CH_2-CH_2-COOH$ and $CH_2-CH_2-SO_3H$.

Suitable radicals $R_3$ and $R_4$ are, in addition to H: $CH_3$, $C_2H_5$, $(CH_2)_2-CH_3$, $CH(CH_3)_2$, $(CH_2)_3-CH_3$, $CH_2-CH(CH_3)_2$, $C(CH_3)_3$, Cl and Br.

Examples of suitable radicals X, where $n=1$, are, in addition to $NH_2$: $NHCH_3$, $NHC_2H_5$, $NHC_3H_7$, $NH-C_4H_9$, $NH-CH_2-CH_2-OH$, $N(CH_3)_2$, $N(C_2H_5)_2$, $N(CH_3)C_2H_5$, $N(CH_3)-CH_2-CH_2OH$, $N(CH_2-CH_2OH)_2$ and

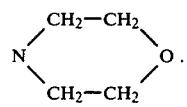

Particularly preferred dyestuffs within the scope of the formula I are those of the formula

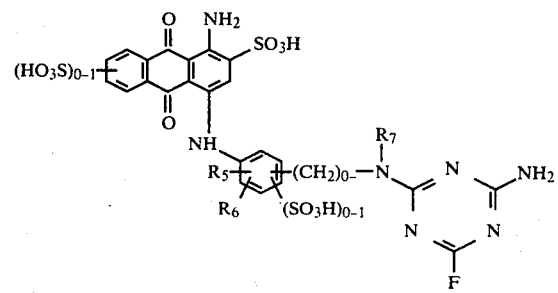

wherein $R_5$, $R_6$ and $R_7 = H$, $CH_3$ or $C_2H_5$, and a sulphonic acid group optionally present in the left-hand part of the anthraquinone system can be in the 5-, 6-, 7- or 8-position.

The new dyestuffs are obtained by a process in which anthraquinone compounds containing amino groups, of the formula

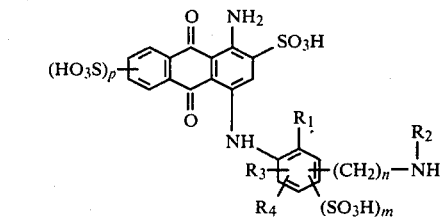

wherein $R_1$ to $R_4$, m, n and p have the abovementioned meaning, are subjected to condensation reactions with 2-amino-4,6-difluorotriazine or 2-alkylamino- or 2-dialkylamino-4,6-difluorotriazines.

According to another preparation procedure, the new reactive dyestuffs (I) are also obtained by a process in which anthraquinone compounds containing amino groups, of the formula (II), are first subjected to condensation reactions with cyanuric fluoride to give intermediate products of the formula

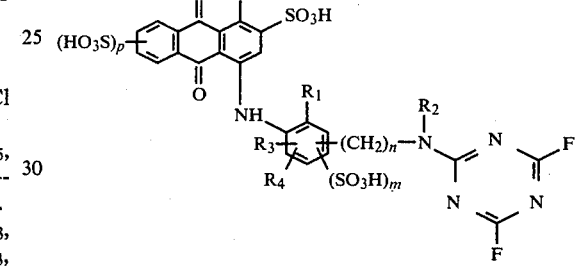

and these products are then reacted with ammonia or compounds which release ammonia, monoalkylamines or dialkylamines in a second reaction step.

Suitable compounds for this last stage are, in addition to ammonia itself, all the ammonium salts, such as, for example, ammonium chloride, ammonium sulphate, ammonium carbonate, ammonium bicarbonate and ammonium nitrate.

The reaction of the aminoanthraquinone compounds (II) with optionally substituted 2-amino-4,6-difluorotriazines is carried out in an aqueous or aqueous-organic medium at temperatures of 0°–80°, preferably 10°–50°, and at pH values of 3–10, preferably 5–9, in the presence of alkaline condensing agents, such as aqueous alkali metal carbonate solutions, alkali metal hydroxide solutions or alkali metal phosphate solutions. The reaction of aminoanthraquinone compounds (II) with cyanuric fluoride is carried out in an aqueous or aqueous-organic medium at temperatures of −10° to +30°, preferably 0°–20°, and at pH values of 2–8, preferably 3–6.

The condensation of the difluorotriazinylanthraquinone compounds (III) with ammonia, monoalkylamines or dialkylamines is carried out at temperatures of 0°–50°, preferably 0°–30°, and at pH values of 7–11, preferably 8–10.

The new dyestuffs are extremely valuable products which are suitable for the most diverse applications. As water-soluble compounds, they are preferably of interest for dyeing textile materials containing hydroxyl groups or nitrogen, in particular textile materials of natural and regenerated cellulose, and furthermore of wool, silk or synthetic polyamide or polyurethane fibres.

The materials mentioned are dyed or printed by the processes customary for reactive dyestuffs. Blue dyeings and prints which are fast to light and wet processing are obtained.

The temperatures given in the examples are in °C. The formulae of the dyestuffs in the description and in the examples are those of the free acids. The dyestuffs are generally isolated and used in the form of their alkali metal salts, in particular the sodium salts or potassium salts.

EXAMPLE 1

15.0 g of 1-amino-4-(3'-amino-2'-methyl-phenylamino)-anthraquinone-2,5'-disulphonic acid are dissolved, at pH 6.5 and at 25°, in 220 ml of water. 4.7 g of 2-amino-4,6-difluorotriazine are introduced into the solution in the course of 15 minutes and the pH value is kept at 6–6.5 with 2 N sodium carbonate solution. The course of the reaction is followed by chromatography. The mixture is subsequently stirred for several hours under the conditions indicated and the dyestuff formed is salted out with 8% of sodium chloride, filtered off and washed with 8% strength sodium chloride solution. The dyestuff of the formula

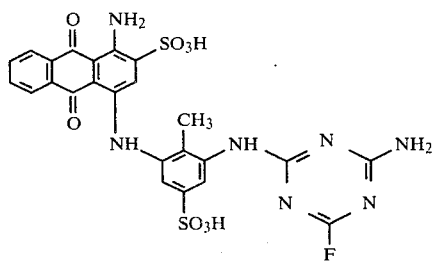

is dried at 45° in vacuo.

50 g of cotton hanks are dyed in 1 liter of dye liquor containing 1.5 g of the above dyestuff by heating the bath to 40° in the course of 30 minutes, adding 50 g of sodium chloride in several portions and then adding 20 g of sodium carbonate and treating the hanks at this temperature for 60 minutes. After rinsing, soaping at the boil and drying, a strong, blue dyeing with excellent fastness to light and wet processing is obtained.

EXAMPLE 2

16.0 g of 1-amino-4-(2',6'-dimethyl-3'-methylaminomethyl-phenylamino)-anthraquinone-2,X'-disulphonic acid are dissolved, at pH 7.5 and at 20°, in 200 ml of water. 4.5 g of 2-amino-4,6-difluorotriazine are added to the solution at a constant rate in the course of 20 minutes and the pH value is kept at 7.0 with 2 N sodium carbonate solution. The reaction is brought to completion by subsequently stirring the mixture for several hours. Any residues of the reactive component are removed by clarifying the dyestuff solution by filtration and the dyestuff is salted out from the filtrate by adding 20% of sodium chloride. The precipitate is filtered off, the filter cake is washed with 20% strength sodium chloride solution and the resulting dyestuff of the formula

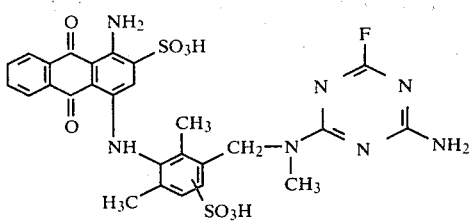

is dried at 50° in vacuo.

Cellulose fabric is printed with a printing paste which contains, per kilogram, 40 g of the above dyestuff, 100 g of urea, 300 ml of water, 500 g of alginate thickener and 20 g of sodium carbonate and which has been made up to 1 kilogram with water, and the fabric is dried, steamed at 105° for 5 minutes, rinsed with hot water and then soaped at the boil, rinsed and dried. A clear, reddish-tinged blue print of very good fastness to wet processing and light is obtained in this manner.

Cellulose materials can be dyed in the following manner:

100 g of cotton fabric are padded at room temperature with an aqueous solution containing 3% by weight of the above dyestuff, 20 g/liter of sodium bicarbonate and 150 g/liter of urea and are intermediately dried, heated to 140° for 2 minutes and then rinsed and soaped at the boil. The fabric is dyed in clear reddish-tinged blue shades which are fast to light and wet processing.

If the anthraquinone components listed in Table I are subjected to condensation reactions with 2-amino-4,6-difluorotriazine in an analogous manner, other reactive dyestuffs with which cotton can be dyed or printed in the colour shades indicated are obtained.

TABLE I

| No. | Anthraquinone component | Colour shade |
|---|---|---|
| 3 | | blue |
| 4 | | blue |
| 5 | | blue |

TABLE I-continued
| No. | Anthraquinone component | Colour shade |
|---|---|---|
| 6 | 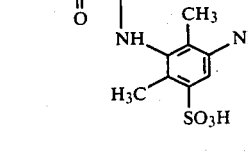 | reddish-tinged blue |
| 7 | 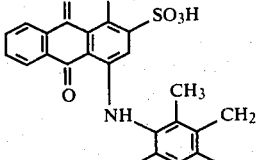 | reddish-tinged blue |
| 8 | 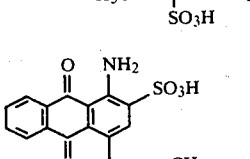 | reddish-tinged blue |
| 9 | 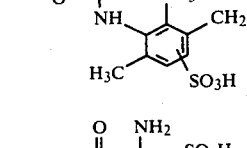 | blue |
| 10 | 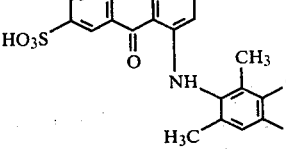 | blue |
| 11 | 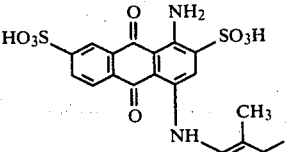<br>6/6 isomer mixture | Greenish-tinged blue |
| 12 | 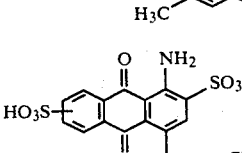<br>5/8 isomer mixture | blue |
| 13 | 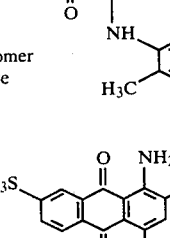<br>6/7 isomer mixture | blue |
| 14 | 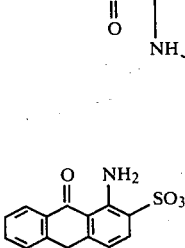 | blue |
| 15 | 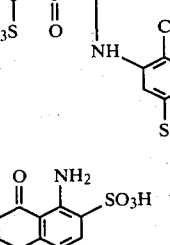 | blue |
| 16 | 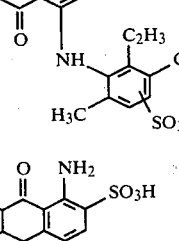 | reddish-tinged blue |
| 17 | 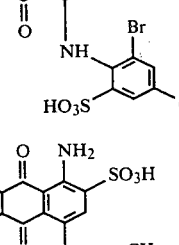 | reddish-tinged blue |
| 18 | 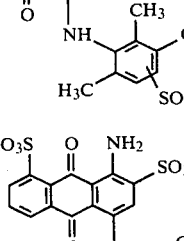 | reddish-tinged blue |
| 19 | 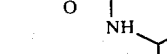 | blue |

TABLE I-continued

| No. | Anthraquinone component | Colour shade |
|---|---|---|
| 20 | | reddish-tinged blue |
| 21 | | blue |
| 22 | | blue |
| 23 | | blue |
| 24 | | blue |
| 25 | | blue |
| 26 | | blue |
| 27 | | reddish-tinged blue |

EXAMPLE 28

18.0 g of 1-amino-4-(3'-amino-2'-methyl-phenylamino)-anthraquinone-2,5'-disulphonic acid are dissolved, at pH 5, in 250 ml of water. After cooling the solution to 0°–5°, the pH value is adjusted to 3.5 by means of dilute hydrochloric acid. 5.8 g of cyanuric fluoride are now added dropwise in the course of 5 minutes and the pH value of the solution is kept at 3.0–3.5 with 1 N sodium carbonate solution. After the dropwise addition, the mixture is subsequently stirred at 0°–5° and at pH 3.5 for a further 5–10 minutes and a solution of 2.4 g of ammonium chloride in 30 ml of water is then added. The pH value is subsequently kept at 8.3–8.5 with sodium carbonate solution. After 4 hours, the temperature is allowed to rise to 20°, 8% of sodium chloride are added gradually and the mixture is stirred for some hours to bring the precipitation to completion. The dyestuff of the formula

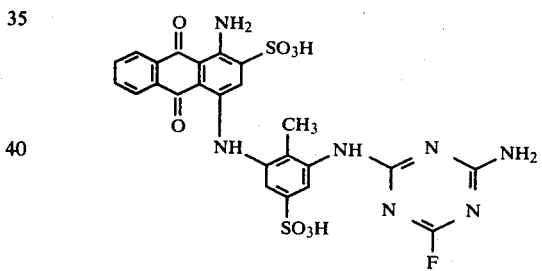

which has precipitated is filtered off, washed with 8% strength sodium chloride solution and dried at 45° in vacuo. The resulting dyestuff is identical to that of Example 1.

EXAMPLE 29

18.0 g of 1-amino-4-(5'-amino-2',4',6'-trimethyl-phenylamino)-anthraquinone-2,3'-disulphonic acid are dissolved, at pH 4.5, in 180 ml of water. The solution is cooled to 0°–5° and 5.5 g of cyanuric fluoride are added dropwise at a constant rate in the course of 5 minutes. During this addition, the pH value of the solution is kept at 4.5 by means of 2 N sodium carbonate solution. The mixture is subsequently stirred for a further 15 minutes under the conditions indicated. When the reaction has ended, a solution of 2.4 g of ammonium chloride in 30 ml of water is added and the pH value is now kept at 8.3–8.5 with 2 N sodium carbonate solution. After about 2–3 hours, the condensation reaction between the difluorotriazinyl dyestuff and ammonia has ended. The solution is warmed to 20° and the resulting dyestuff of the formula

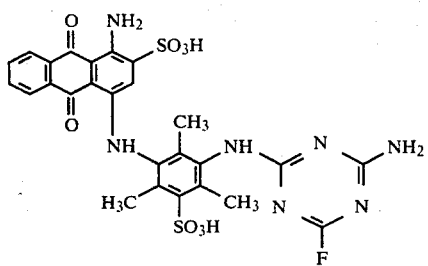

is salted out of it by adding 22% of potassium chloride. The product which has precipitated is filtered off, washed with 25% strength potassium chloride solution and dried at 40° in vacuo.

Besides using the dyeing and printing processes mentioned in Examples 1 and 2, cotton can also be dyed by the following process:

100 g of cotton fabric are padded on a padder at room temperature using an aqueous solution containing 30 g/liter of the dyestuff of Example 29 and 20 g/liter of sodium carbonate such that the liquor pick-up of the fabric is 80% of its dry weight. The fabric is rolled up and kept at 25° for 24 hours such that no moisture can escape. The fabric is then rinsed, soaped at the boil and dried. A clear, reddish-tinged blue dyeing which has very good fastness to light and wet processing is obtained.

In an analogous manner, other reactive dyestuffs, with which cotton can be dyed or printed in the colour shades indicated, can be prepared by reacting the anthraquinone components indicated in Table II with cyanuric fluoride and subjecting the resulting difluorotriazinyl dyestuffs to condensation reactions with ammonia or ammonium chloride.

TABLE II

| No. | Anthraquinone component | Colour shade |
|---|---|---|
| 30 | (structure) | reddish-tinged blue |
| 31 | (structure) | blue |
| 32 | (structure) | reddish-tinged blue |
| 33 | (structure) | blue |
| 34 | (structure) | blue |
| 35 | (structure) | blue |
| 36 | (structure) | blue |
| 37 | (structure) | blue |

EXAMPLE 38

25.0 g of 1-amino-4-(2',6'-dimethyl-3'-methylaminomethyl-phenylamino)-anthraquinone-2,X'-disulphonic acid are dissolved, at pH 7.0 and at 20°–25°, in 250 ml of water.

7.7 g of 2,4-difluoro-6-methylamino-triazine are introduced into this solution in the course of 20–30 minutes and the pH value is kept at 6.5–7.0 by adding 1 N sodium hydroxide solution. The mixture is subsequently stirred for 1½ hours in order to bring the reaction to completion. 22% of sodium chloride are now added to the solution at a constant rate in the course of 30 minutes. The dyestuff which has precipitated is filtered off, washed with 25% strength sodium chloride solution and dried at 45° in vacuo.

The dyestuff corresponds to the formula

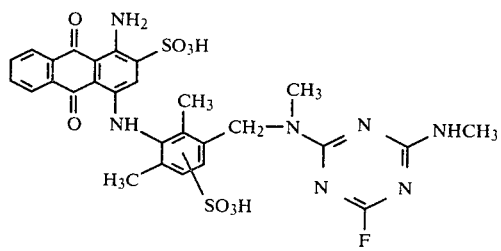

and on cellulose fabric gives, by the printing process of Example 2, clear, reddish-tinged blue prints which have excellent fastness to light and wet processing.

EXAMPLE 39

18.0 g of 1-amino-4-(2',6'-dimethyl-3'-aminomethylamino)-anthraquinone-2,X'-disulphonic acid are dissolved, at pH 7–8 and at 35°, in 180 ml of water. A solution of 7.2 g of 2-diethylamino-4,6-difluorotriazine in 35 ml of acetone is added dropwise at 30°–35° in the course of 30 minutes and the pH value is kept at 6.5–7.0 with 1 N sodium hydroxide solution. After subsequently stirring the mixture for one hour, the temperature is increased to 40–45° and the pH value is kept at 7.0 for a further 2 hours.

Any residues of the triazine component are filtered off and the filtered dyestuff solution is allowed to run into twice the volume of 25% strength sodium chloride solution. The dyestuff of the formula

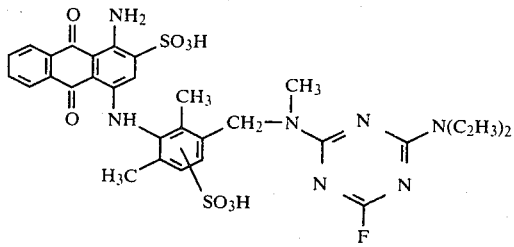

which has precipitated is filtered off, washed with 15% strength sodium chloride solution and dried at 50° in vacuo.

Following the printing instructions of Example 2, on cotton and viscose staple the dyestuff gives clear reddish-tinged blue prints which are very fast to light and wet processing.

If the anthraquinone components and substituted 2-amino-4,6-difluorotriazines listed in Table III are subjected to condensation reactions in an analogous manner, other reactive dyestuffs with which cotton or viscose staple can be printed in the shades indicated are obtained.

TABLE III

| No. | Anthraquinone component | Reactive component | Colour shade |
|---|---|---|---|
| 40 | 1-amino-4-[(2',6'-dimethyl-3'-(N-methylaminomethyl))anilino]-anthraquinone-2,X'-disulphonic acid | 2-fluoro-4-fluoro-6-dimethylamino-triazine | reddish-tinged blue |
| 41 | 1-amino-4-[(2',6'-dimethyl-3'-aminomethyl)anilino]-anthraquinone-2,X'-disulphonic acid | 2-fluoro-4-fluoro-6-ethylamino-triazine | reddish-tinged blue |
| 42 | 1-amino-4-[(2',6'-dimethyl-3'-aminomethyl)anilino]-anthraquinone-2,X'-disulphonic acid | 2-fluoro-4-fluoro-6-(2-hydroxyethylamino)-triazine | reddish-tinged blue |
| 43 | 1-amino-4-[(2',6'-dimethyl-3'-(N-methylaminomethyl))anilino]-anthraquinone-2,X',X''-trisulphonic acid | 2-fluoro-4-fluoro-6-butylamino-triazine | blue |

TABLE III-continued
| No. | Anthraquinone component | Reactive component | Colour shade |
|---|---|---|---|
| 44 | 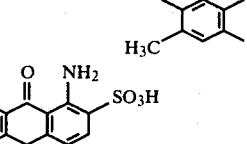 | 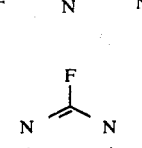 | blue |
| 45 | 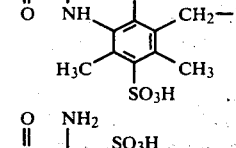 | 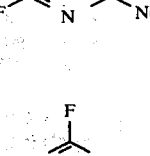 | reddish-tinged blue |
| 46 | 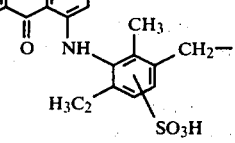 | 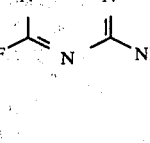 | reddish-tinged blue |
| 47 | 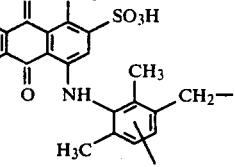 | 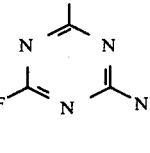 | reddish-tinged blue |
| 48 | 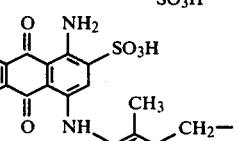 | 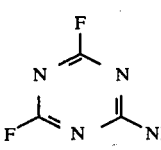 | reddish-tinged blue |
| 49 | 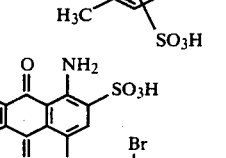 | 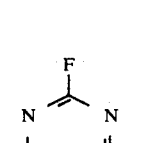 | reddish-tinged blue |
| 50 | 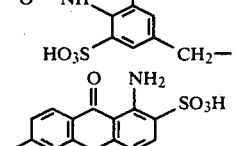 | 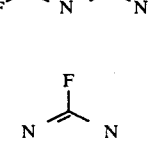 | blue |
| 51 | 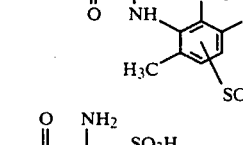 | 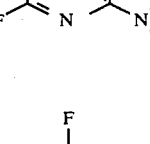 | blue |
We claim:
1. Dyestuffs of the formula

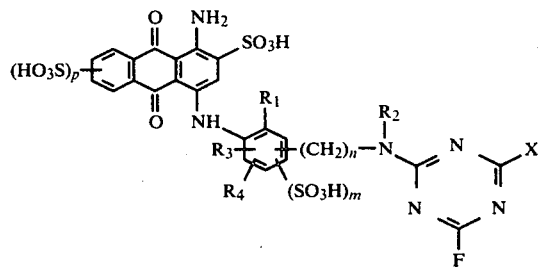

wherein $R_1 = C_1-C_4$-alkyl or halogen, $R_2 = H$ or $C_1-C_4$-alkyl, $R_3$ and $R_4 = H$, $C_1-C_4$-alkyl or halogen, m, n and p = 0 or 1 and $X = NH_2$.

2. Dyestuffs of the formula

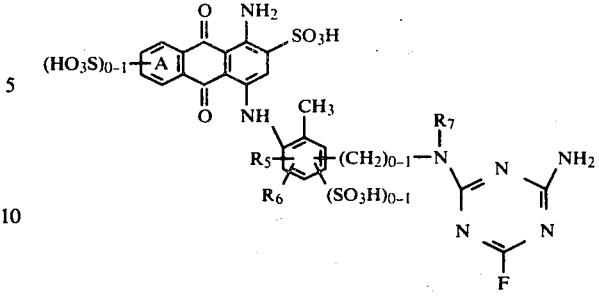

wherein $R_5$, $R_6$ and $R_7 = H$, $CH_3$ or $C_2H_5$, and a sulphonic acid group optionally present in the part of the anthraquinone system labelled A is in the 5-, 6-, 7- or 8-position.

3. A process for dyeing and printing materials containing hydroxyl groups or nitrogen, which comprises applying to said dyeing and printing materials a dyestuff of claim 1 or 2.

4. A printing material containing hydroxyl groups or nitrogen, dyed or printed with the dyestuffs of claim 1 or 2.

5. A process of claim 3 wherein the dyeing and printing materials are cellulose materials.

* * * * *

UNITED STATES PATENT AND TRADEMARK OFFICE
CERTIFICATE OF CORRECTION

PATENT NO. : 4,273,553

DATED : Jun. 16, 1981

INVENTOR(S) : Wolfgang Harms, et al.

It is certified that error appears in the above—identified patent and that said Letters Patent is hereby corrected as shown below:

Column 1, last formula Delete "$-(CH_2)_0-\underset{R_7}{N}-$" and insert -- $-(CH_2)_{0-1}-\underset{R_7}{N}-$ --.

Column 6, formula 16 Delete "$C_2H_3$" and insert --$C_2H_5$--.

Column 6, formula 18 Delete "$C_2H_3$" and insert --$C_2H_5$--.

Column 7, formula 20 Delete "$C_2H_3$" and insert --$C_2H_5$--.

Column 7, formula 22 Delete "$C_2H_3$" both occurrences and insert --$C_2H_5$--.

UNITED STATES PATENT AND TRADEMARK OFFICE
CERTIFICATE OF CORRECTION

PATENT NO. : 4,273,553
DATED : June 16, 1981
INVENTOR(S) : Wolfgang Harms, et al.

It is certified that error appears in the above—identified patent and that said Letters Patent is hereby corrected as shown below:

Column 8, formula 27  Delete "$C_2H_3$" both occurrences and insert --$C_2H_5$--.

Column 12, line 10  Delete "$N(C_2H_3)_2$" and insert --$N(C_2H_5)_2$--.

Column 11/12, formula 41  Delete "$NHC_2H_3$" and insert --$NHC_2H_5$--.

Signed and Sealed this

Fourth Day of May 1982

[SEAL]

Attest:

GERALD J. MOSSINGHOFF

Attesting Officer     Commissioner of Patents and Trademarks